United States Patent Office.

JULIUS HACKERT, OF NEW YORK, N. Y.

Letters Patent No. 62,128, dated February 19, 1867.

---

IMPROVED COMPOSITION CALLED ARTIFICIAL IVORY.

---

The Schedule referred to in these Letters Patent and making part of the same.

---

TO ALL WHOM IT MAY CONCERN:

Be it known that I, JULIUS HACKERT, of No. 452 Fifth street, in the city, county, and State of New York, have invented a new and useful improvement in Artificial Ivory; and I do hereby declare that the following is a full, clear, and exact description thereof, which will enable those skilled in the art to make and use the same.

The object of this invention is to produce artificial ivory, which shall have the desirable qualities of natural ivory, and can be substituted therefor in making billiard balls, handles for knives, and other articles of ornament or use.

In carrying out my invention, I take chloride of zinc, which I prepare in the following manner, although it may be prepared or made in any other manner, if preferred: Take of muriatic acid three parts, by weight; place therein one part by weight of zinc, and allow the zinc to be acted on and be dissolved by the acid for about the space of two hours; then filter the solution, and add thereto one and one-half part by weight of lime; the lime becoming dissolved forms with the solution a sirup-like mass. I take of this mass about four and one-half ounces and mix with about four ounces of oxide of zinc, or with a like quantity of other metallic oxide, such, for instance, as the oxide of lead. If the articles which are to be produced from the compound are required to possess great hardness, I add to the mixture two ounces of pulverized glass or its equivalent, but if the articles are not required to possess great hardness I leave out the glass. The several ingredients are mixed in a cold state, and if it is desired to color the compound, suitable coloring matter to produce the shade required is added while mixing the said ingredients. The compound is then introduced into moulds of proper forms to produce the articles which it is designed to make, pressure being applied to make the compound conform to the moulds. After the articles are taken from the moulds they are polished with liquid glass of soda or other suitable material.

The proportions above stated may be varied, but I obtain satisfactory results from the proportions above given.

Having thus described my invention, what I claim as new, and desire to secure by Letters Patent, is—

1. The combination of chloride of zinc and lime with oxide of zinc, or other metallic oxide, substantially as above set forth for producing artificial ivory.

2. I also claim the combination of chloride of zinc and lime with oxide of zinc, or other metallic oxide, and pulverized glass or its equivalent, substantially as and for the purpose above set forth.

JULIUS HACKERT.

Witnesses:
    W. HAUFF,
    RUDOLF WÜSTE.